United States Patent [19]

Lee et al.

[11] Patent Number: 5,748,969

[45] Date of Patent: May 5, 1998

[54] ARBITRATION APPARATUS USING LEAST RECENTLY USED ALGORITHM

[75] Inventors: Suk Joong Lee; Jin Kook Choi, both of Bubaleub, Rep. of Korea

[73] Assignee: Hyundai Electronics Industries Co., Ltd., Rep. of Korea

[21] Appl. No.: 649,134

[22] Filed: May 14, 1996

[30] Foreign Application Priority Data

May 15, 1995 [KR] Rep. of Korea ............... 1995-11924

[51] Int. Cl.$^6$ ...................................... G06F 13/14
[52] U.S. Cl. ..................... 395/732; 395/728; 395/729; 395/293
[58] Field of Search .................... 395/288, 725, 395/280, 728, 729, 732, 293; 364/200

[56] References Cited

U.S. PATENT DOCUMENTS

| | | |
|---|---|---|
| 4,609,995 | 9/1986 | Hasebe . |
| 4,953,081 | 8/1990 | Feal et al. . |
| 5,339,443 | 8/1994 | Lockwood . |
| 5,392,434 | 2/1995 | Bryant et al. . |
| 5,583,999 | 12/1996 | Sato et al. . |

OTHER PUBLICATIONS

Messmer, Hans–Peter, The Indispensable PC Hardware Book, p. 818, 1995.

Primary Examiner—Jack B. Harvey
Assistant Examiner—Rupal D. Dharia
Attorney, Agent, or Firm—Blakely Sokoloff Taylor & Zafman

[57] ABSTRACT

An arbitration apparatus using a least recently used (LRU) algorithm, wherein when a plurality of request devices simultaneously request to use a shared resource, such requests are arbitrated in such a manner that the right to use the shared resource is assigned to the request device with the highest priority. The apparatus includes a priority determining unit for receiving shared-resource request signals from a plurality of request devices and resource using order signals respectively associated with the request devices, thereby outputting a grant signal for the request device with the highest priority along with an arbitration-done signal, a recording register for receiving the grant signal, associated with the use of the shared resource, from the priority determining unit, the recording register storing the resource using order based on the grant signal and outputting the stored data to the priority determining unit, and a status machine for receiving the arbitration-done signal from the priority determining unit along with the request signals from the request devices and other control signals, thereby outputting a status information and control signal to the priority determining unit and a recording register control signal to the recording register.

6 Claims, 5 Drawing Sheets

ARBITRATION APPARATUS USING LEAST RECENTLY USED ALGORITHM

BACKGROUND OF THE INVENTION

1. Field of the Invention

The present invention relates to an arbitration apparatus, and more particularly to an arbitration apparatus using a least recently used (LRU) algorithm, wherein when a plurality of request devices simultaneously request to use a shared resource, such requests are arbitrated in such a manner that the right to use the shared resource is assigned to the request device with the highest priority.

2. Description of the Prior Art

Systematically different devices may use a shared bus so that one of those devices may read data out of the other one or write data to the other one. In this case, a plurality of request devices may require to simultaneously use the shared bus. For this reason, an arbitration device is needed.

In general, such an arbitration device operates, upon simultaneously receiving requests for the use of a shared resource, in an fixed mode, wherein it provides a priority in accordance with an set or fixed order, or in a rotating mode, wherein the request device most recently using the shared resource in accordance with a designated order has the lowest priority level whereas the next one has the highest priority level.

However, it may occur that a particular one of request devices can not use the shared resource for a long period or has to be standby for a long period. In such a case, it is difficult to ensure a fairness to the right of using the shared resource.

Although a least recently used mode has been proposed to solve the problems involved in the fixed and rotating modes, it needs information about the order that request devices use the shared resource. For this reason, it is required to use a number of memory registers, thereby resulting in an increased memory area.

SUMMARY OF THE INVENTION

Therefore, an object of the invention is to solve the above-mentioned problems involved in the prior art and to provide an arbitration apparatus using an LRU algorithm, capable of achieving an efficient bit coding using a reduced number of bits, namely, a reduced number of registers.

In accordance with the present invention, this object is accomplished by providing an arbitration apparatus using a least recently used algorithm, comprising: a priority determining unit for receiving shared-resource request signals from a plurality of request devices and resource using order signals respectively associated with the request devices, thereby outputting a grant signal for the request device with the highest priority along with an arbitration-done signal; a recording register for receiving the grant signal, associated with the use of the shared resource, from the priority determining unit, the recording register storing the resource using order based on the grant signal and outputting the stored data to the priority determining unit; and a status machine for receiving the arbitration-done signal from the priority determining unit along with the request signals from the request devices and other control signals, thereby outputting a status information and control signal to the priority determining unit and a recording register control signal to the recording register.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
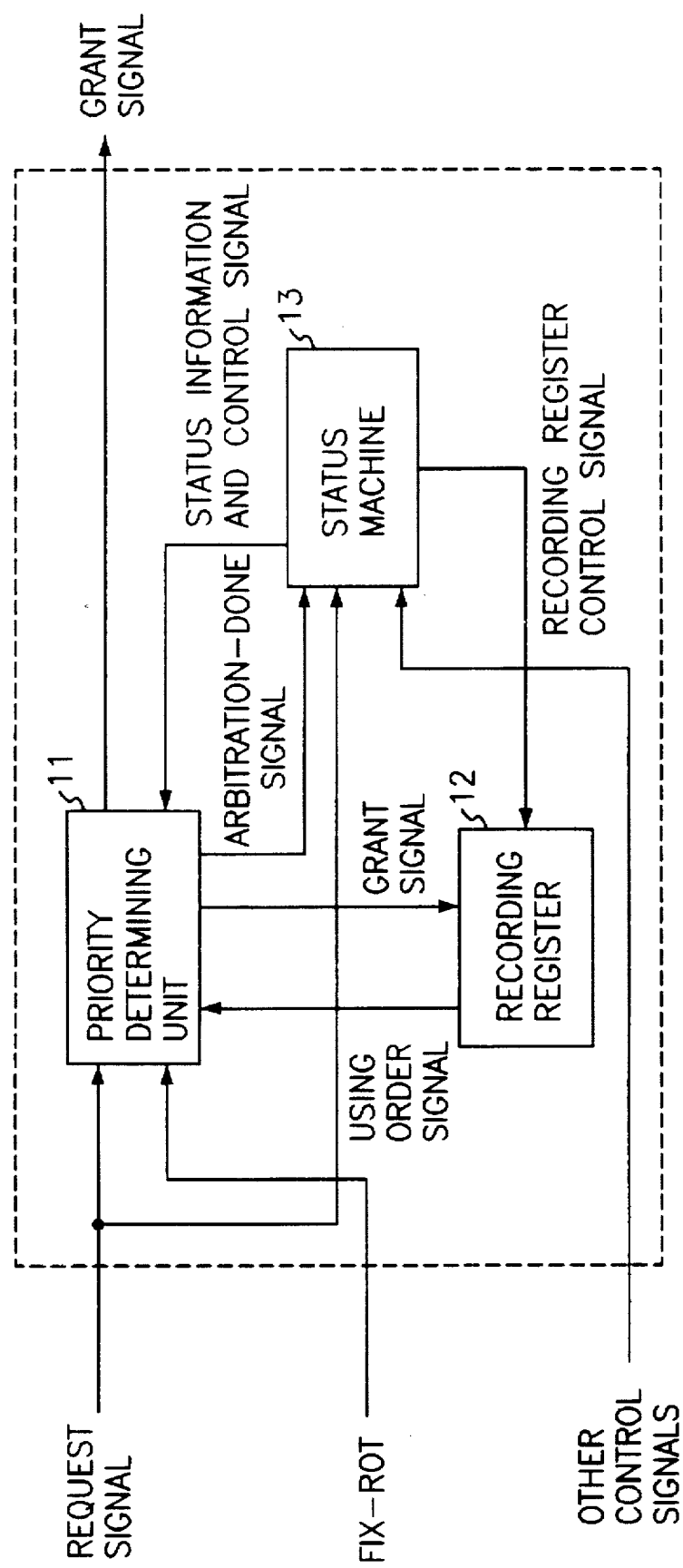
FIG. 1 is a block diagram illustrating an arbitration apparatus in accordance with the present invention.

FIG. 1 is a block diagram illustrating an arbitration apparatus in accordance with the present invention. In FIG. 1, the reference numeral 11 denotes a priority determining unit, 12 a recording register, and 13 a status machine.

As shown in FIG. 1, the priority determining unit 11 receives shared-resource request signals from a plurality of request devices and resource using order signals each indicative of the order that each request device uses the shared resource. On the basis of the received signals, the priority determining unit 11 outputs a grant signal for the request device with the highest priority. The priority determining unit 11 also outputs an arbitration-done signal. To the priority determining unit 11, a signal fixrot for designating a priority determining mode for the priority determining unit 11 is also applied. Based on the signal fixrot, the priority determining unit 11 determines whether the priority is given in a fixed mode or an LRU mode.

The recording register 12 receives the grant signal, associated with the use of the shared resource, from the priority determining unit 11. Based on the grant signal, the recording register 12 stores the order that the shared resource is used. The stored data is subsequently provided to the priority determining unit 11. On the other hand, the status machine 13 serves to control the whole parts of the arbitration apparatus. The status machine 13 receives the arbitration-done signal from the priority determining unit 12. The status machine 13 also receives the request signals from the request devices which are applied to the priority determining unit 11, along with other control signals. On the basis of the received signals, the status machine 13 outputs a status information and control signal which will be applied to the priority determining unit 11. The status machine 13 also applies a recording register control signal to the recording register 12.

The arbitration apparatus having the above-mentioned arrangement have three statuses, namely, a non-request, namely, parking status PARK, an arbitration-go status ARBI GO and an arbitration-done status ARBIDONE.

The parking status PARK corresponds to the status wherein any of the request devices does not request to use the shared resource. In this status, a grant signal for granting the priority to a designated request device is output so that the designated request device can immediately use the shared resource when it requests. The arbitration-go status ARBIGO corresponds to the status wherein when request signals for the shared resource are generated, a grant signal is output in accordance with an arbitration procedure carried out based on the request signals along with information recorded in the recording register 12. On the other hand, the arbitration-done status ARBIDONE corresponds to the status that the arbitration procedure is completely carried out. In the arbitration-done status ARBIDONE, the presently granted request device is using the shared resource.

Figure 2:
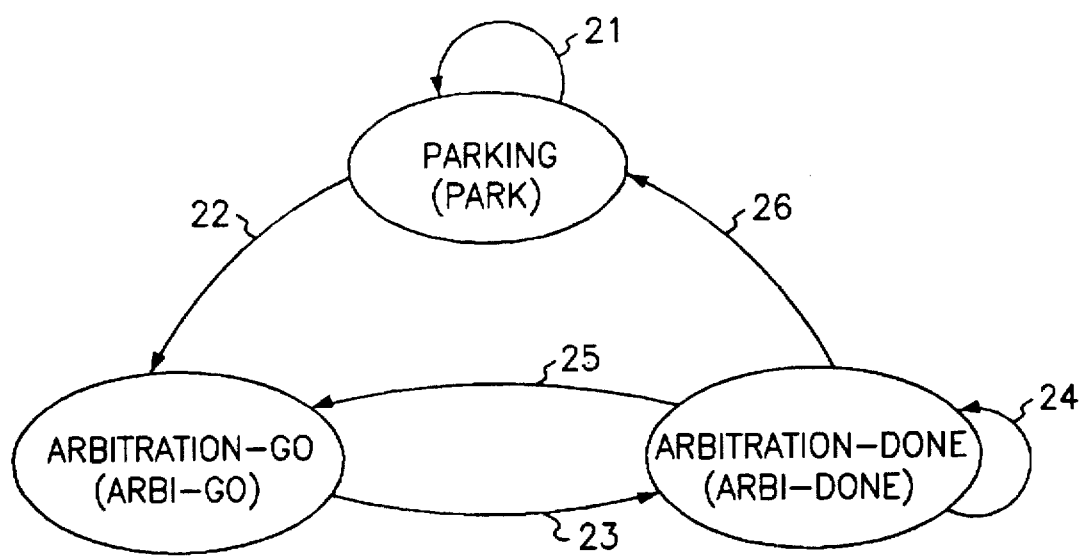
FIG. 2 is a schematic view illustrating the status transition of a status machine equipped in the arbitration apparatus in accordance with the present invention.

FIG. 2 is a schematic view illustrating the status transition of the status machine. Initially, the status machine is maintained in the parking status PARK because there is no request for the shared resource (Step 21). Once the status machine receives request signals, it is switched to the arbitration-go status (Step 22). The request device granted the right to preferentially use the shared resource in the parking status PARK should be the most significant one or have the highest using rate.

The status machine is switched from the arbitration-go status ARBIGO to the arbitration-done status ARBIDONE as its arbitration procedure is carried out (Step 23). In the arbitration-done status ARBIDONE, the request device, which has obtained the right to use the shared resource after the arbitration, uses the shared resource (Step 24).

After completing the use of the shared resource, the status machine returns to the arbitration-go status (Step 25) if request signals are generated. If there is no request signal, the status machine returns to the parking status (Step 26).

The recording register 12, which records the order of using the shared resource, needs $N(N-1)/2$ bits for N request devices (here, N is not less than 2).

Where the relative resource using order among a plurality of request devices is simply recorded, $N*B$ (B represents the number of bits required to code N bits) are needed for N request devices. For example, where a coding is carried out for three request devices, 2 bits are required. In this case, accordingly, 6 bits are totally needed to record the relative resource using order among the three request devices because the total number of bits corresponds to $3*2$ in accordance with the above-mentioned equation. 4 bits are totally required, even when no coding is carried out for the request device which has least recently used the shared resource (this request device can be found by finding only the resource using order of the remaining two request devices which have more recently used the shared resource than the former request device.

In this case, however, the number of bits capable of achieving an efficient coding operation corresponds to $3*2/2$. That is, only 3 bits are needed.

Figure 3A:
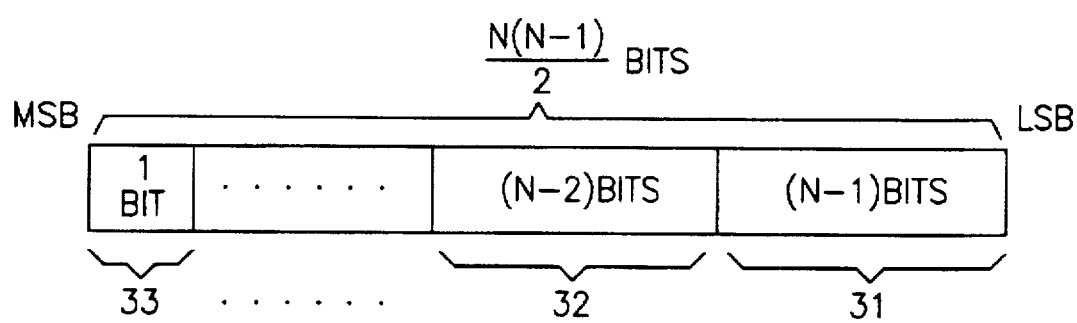
FIGS. 3A and 3B are schematic views respectively illustrating a bit allocation to a recording register equipped in the arbitration apparatus for N request devices in accordance with the present invention.
Figure 3B:
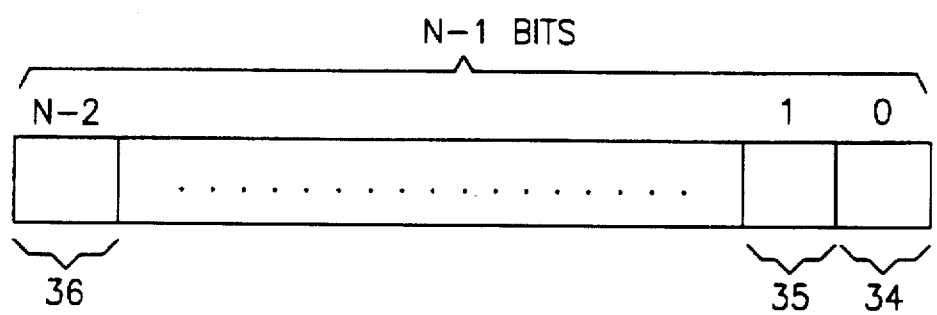

FIGS. 3A and 3B are schematic views respectively illustrating a bit allocation to the recording register for N request devices. Referring to FIGS. 3A and 3B, it can be found that the resource using order among the N request devices is recorded in a relative manner to totally reduce the number of allocated bits.

For example, the first bit string from the least significant place, namely, the "N-1"-bit string 31 indicates the relative resource using order between the first one of the request devices and each of the remaining request devices. Where the first request device has more recently used the shared resource than the other request device, the bit indicative of the relative resource using order has a value of 1. If not, the bit has value of 0.

This will be described in more detail, in conjunction with the "N-1"-bit string 31 shown in FIG. 3B. The 0th bit 34 which is the least significant bit (LSB) indicates the relative resource using order between the first and second request devices. The next, first bit 35 indicates the relative resource using order between the first and third request devices. The remaining bits represent relative resource using orders each between the first request devices and each of the remaining request devices, respectively. In order to record the relative resource using order between the first request device and each of the remaining request device, accordingly, N-1 bits are required because the last, "N-2"-th bit 36 indicates the relative resource using order between the first and N-th request devices.

The "N-2"-bit string 32 is adapted to record the relative resource using order between the second request device and each of the remaining request devices except for the first request device. In order to record this relative resource using order, N-2 bits are needed. In such a manner, the last 1 bit 33, which is the most significant bit (MSB), indicates the relative resource using order between the "N-1"-th and "N"-th request devices. The meaning of each bit is expressed as shown in FIG. 3B.

Figure 4:
FIG. 4 is a schematic view illustrating a bit allocation to the recording register for three request devices in accordance with the present invention.

FIG. 4 is a schematic view illustrating a bit allocation to the recording register for three request devices. Referring to the description made in conjunction with FIGS. 3A and 3B, it can be understood that the bit allocation to the recording register is achieved using only 3 bits. In this case, the allocated bits have the following meanings:

0th bit: the relative resource using order between the first and second request devices;

1st bit: the relative resource using order between the first and third request devices; and 2nd bit: the relative resource using order between the second and third request devices.

For example, where the bit string has a bit value of "110", it can be found that the first request device has not used the shared resource for a longer period than the second request device because the 0th bit has a value of 0, that the third request device has not used the shared resource for a longer period than the first request device because the first bit has a value of 1, and that the third request device has not used the shared resource for a longer period than the second request device because the second bit has a value of 1. The relative resource using order among the request devices from the longest period can be expressed as follows:

Third One>Second One>First One

In this case, accordingly, the priority for using the shared resource is granted to the third request device when request signals from the request devices are simultaneously generated.

Figure 5:
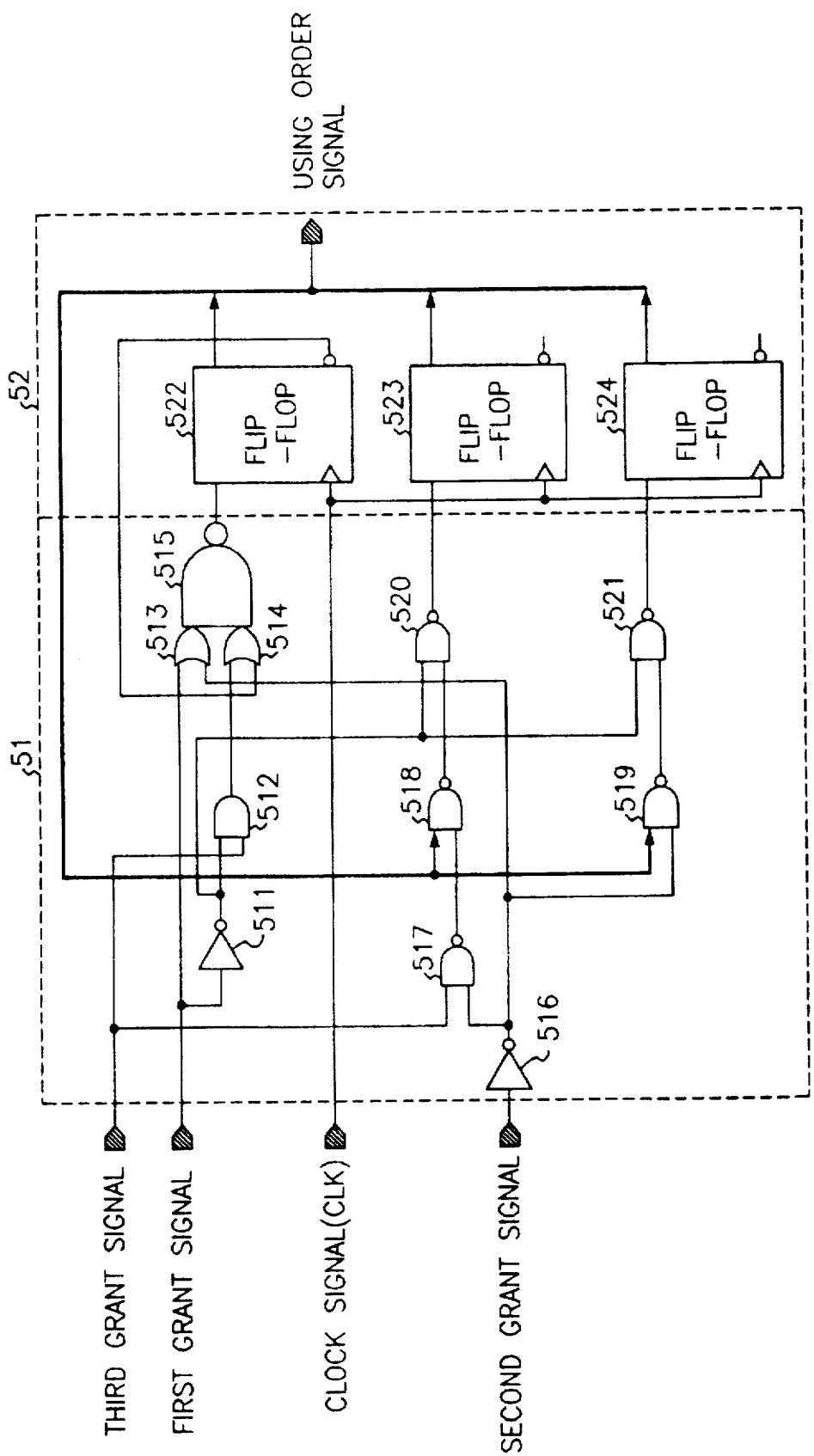
FIG. 5 is a circuit diagram of the recording register used for three request devices in accordance with the present invention.

FIG. 5 is a circuit diagram of the recording register used for three request devices. As shown in FIG. 5, the recording register includes a control part 51 receiving, at its input, grant signals from the priority determining unit 11, and a register part 52 for storing and outputting information about the order that the request devices use the shared resource, under the control of the control part 51.

The control part 51 includes an inverter 511 adapted to receive a first grant signal associated with the first one of the request devices, an inverter 516 adapted to receive a second grant signal associated with the second one of the request devices, an AND gate 512 adapted to receive the output from the inverter 511 and a third grant signal associated with the third one of the request devices, and an OR gate 513 adapted to receive the first grant signal and the output from the inverter 516. The control part 51 also includes an OR gate 514 adapted to receive the output from the AND gate 512 and the inverted value of a previous using order signal associated with the third request device, and a NAND gate 515 adapted to receive outputs respectively from the OR gates 513 and 514. The control part 51 further includes a NAND gate 517 adapted to receive the third grant signal and the output from the inverter 516, a NAND gate 518 adapted to receive the output from the NAND gate 517 and the previous using order signal, a NAND gate 519 adapted to receive the output from the inverter 516 and the previous using order signal, a NAND gate 520 adapted to receive outputs from the NAND gate 518 and inverter 511, and NAND gate 512 adapted to receive outputs from the NAND gate 519 and inverter 511.

On the other hand, the register part 52 includes a flip-flop 522 adapted to receive the output from the NAND gate 515 in response to a clock signal CLK externally received thereto, thereby outputting a using order signal associated with the third request device at its invert and non-invert output terminals, a flip-flop 523 adapted to receive the output from the NAND gate 520 in response to the clock signal CLK externally received thereto, thereby outputting a using order signal associated with the second request device at its invert and non-invert output terminals, and a flip-flop 524 adapted to receive the output from the NAND gate 521 in response to the clock signal CLK externally received thereto, thereby outputting a using order signal associated with the first request device at its invert and non-invert output terminals.

The bits allocated to the recording register 12 having the above-mentioned arrangement have values respectively varying in accordance with the using grant signals. This will be described in detail.

Where the first request device is granted the priority to use the shared resource, the 0th and first bits allocated to the recording register vary to have a value of 1. In this case, the remaining bit does not vary. Where the second request device is granted the priority to use the shared resource, the 0th bit allocated to the recording register has a value of 0, whereas the second bit has a value of 1.

When the third request device is granted the priority to use the shred resource, the first and second bits allocated to the recording register have a value of 0. In this case, the remaining bit does not vary.

Figure 6:
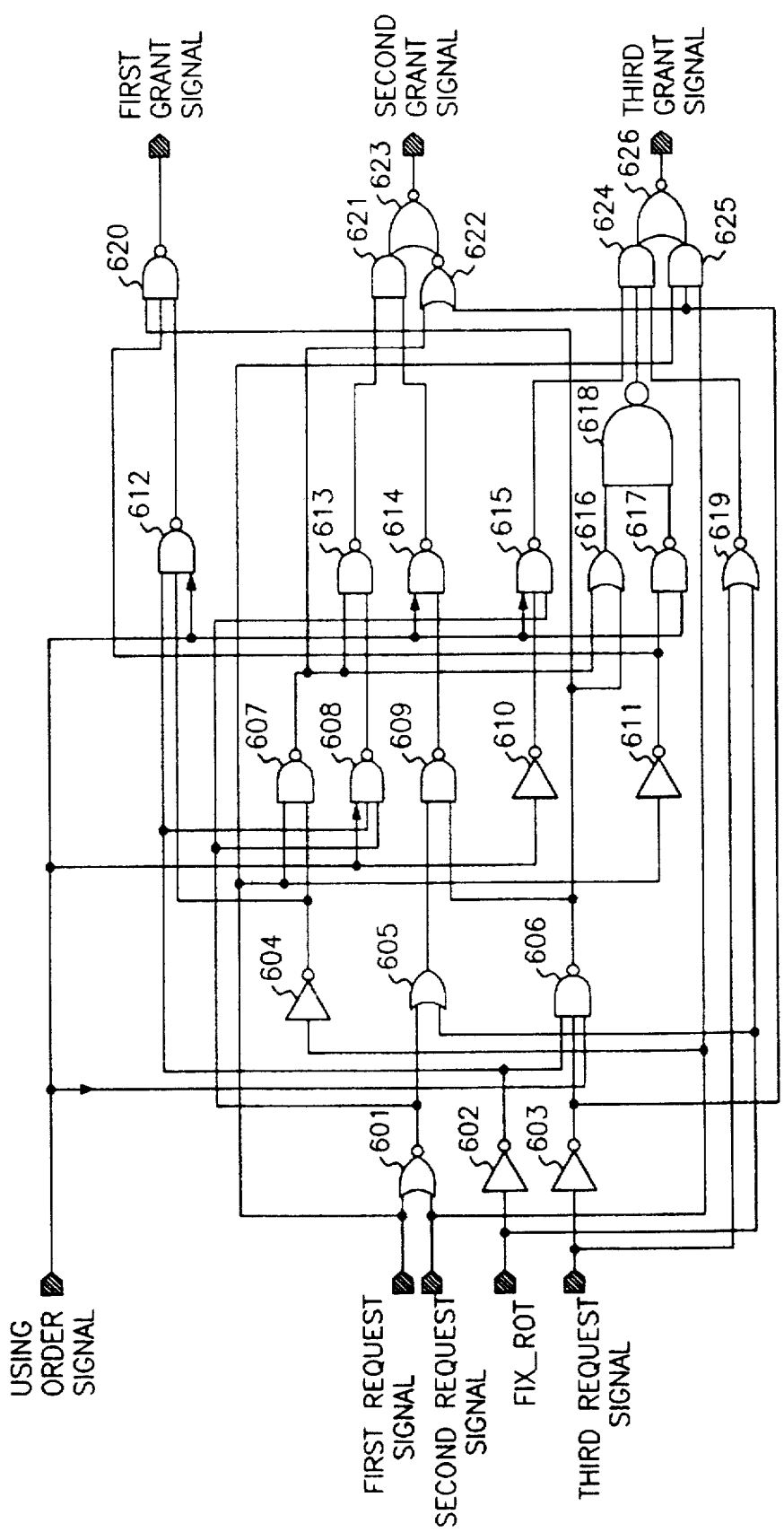
FIG. 6 is a circuit diagram of a priority determining unit equipped in the arbitration apparatus in accordance with the present invention, which is used for the three request devices.

FIG. 6 is a circuit diagram of the priority determining unit used for the three request devices. As shown in FIG. 6, the priority determining unit includes a NAND gate 601 adapted to receive a first request signal from the first request device and a second request signal from the second request device, an inverter 602 adapted to a signal fixrot for designating a priority determining mode, an inverter 603 adapted to receive a third request signal from the third request device, and an inverter adapted to receive the second request signal. The priority determining unit also includes a NAND gate 605 adapted to receive the output from the NAND gate 601 and the signal fixrot, a NAND gate 606 adapted to receive outputs from the inverters 602 and 603 and the using order signal output from the recording register 12, a NAND gate 607 adapted to receive the first request signal and the output from the inverter 604, a NAND gate 608 adapted to receive the using order signal and outputs from the inverter 602 and NAND gate 601, and a NAND gate 609 adapted to receive outputs from the NAND gate 605 and 606. The using order signal is also received to an inverter 610. The first request signal is also received to an inverter 611. The priority determining unit further includes a NAND gate 612 adapted to outputs from the inverters 602 and 604 along with the using order signal, a NAND gate 613 adapted to receive outputs from the NAND gates 607 and 608, a NAND gate 614 adapted to receive the output from the NAND gate 609 along with the using order signal, and a NAND gate 615 adapted to receive outputs from the inverter 610 and NAND gate 601 along with the using order signal. An OR gate 616 is also provided which receives outputs from the NAND gate 607 and inverter 610. The priority determining unit further includes a NAND gate 618 adapted to receive outputs from the OR gate 616 and NAND gate 617, and a NOR gate 619 adapted to receive the third request signal along with the signal fixrot. A NAND gate 620 is also provided which receives outputs from the NAND gate 606, inverter 611 and NAND gate 612, thereby outputting the first grant signal. The priority determining unit further includes a NAND gate 621 adapted to receive outputs from the NAND gates 613 and 614, and a NOR gate 622 adapted to receive outputs from the NAND gate 607 and inverter 603. A NAND gate 624 is also provided which receives outputs from the NAND gates 615 and 618 along with the output from the NOR gate 619, thereby outputting the second grant signal. The priority determining unit further includes a NAND gate 624 adapted to receive outputs from the NAND gates 615 and 618 along with the output from the NOR gate 619, a NAND gate 625 adapted to receive the first and second request signals along with the output from the inverter 603 and a NOR gate 626 adapted to receive outputs from the NAND gates 624 and 625, thereby outputting the third grant signal.

When the priority determination of the priority determining unit 11 having the above-mentioned arrangement is carried out in the fixed mode, it can be simply achieved by granting the right to use the shared resource to the request device with the highest priority irrespective of the number of simultaneously generated request signals.

When the priority determining unit 11 operates in the LRU mode, the priority order of the request devices varies in accordance with the number of simultaneously generated request signals along with values of the bits stored in the recording register 12. This will be described in detail in conjunction with the number of request signals.

Where three request signals are simultaneously received to the priority determining unit, the first request device is granted the priority if the 0th and first bits have a value of 0. If the first bit has a value of 0 in this case whereas the 0th bit has a value of 1, the second request device is granted the priority. The third request device is granted the priority when the first bit has a value of 1 whereas the 0th bit has a value of 0. The third request device is also granted the priority when the 0th and first bits have a value of 1 whereas the second bit has a value of 1. The second request device is also granted the priority when all the 0th, first and second bits have a value of 0.

On the other hand, where two request signals from the first and second request devices are simultaneously received to the priority determining unit, the priority is assigned to the second request device if the 0th bit has a value of 1 and to the first request device if the 0th bit has a value of 0. Where two request signals from the first and third request devices are simultaneously received to the priority determining unit, the priority is assigned to the third request device if the first bit has a value of 1 and to the first request device if the first bit has a value of 0.

Where two request signals from the second and third request devices are simultaneously received to the priority determining unit, the priority is assigned to the third request device if the second bit has a value of 1 and to the second request device if the second bit has a value of 0.

On the other hand, where the priority determining unit receives only one request signal, the priority is assigned to the request device which generates the request signal.

The arbitration apparatus of the present invention may be structured in the form of an integrated circuit so that it may be added as a unit element to a system requiring such an arbitration apparatus. Where the arbitration apparatus of the present invention is applied to a peripheral component interconnect system including a plurality of shared-resource request devices on a shared bus, it ensures a fair bus arbitration.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An arbitration apparatus using a least recently used algorithm, comprising:

a priority determining unit for receiving shared-resource request signals from a plurality of request devices having priorities and a shared resource using order signals respectively associated with the request devices, thereby outputting a grant signal for the request device with the highest priority along with an arbitration-done signal;

a recording register for receiving the grant signal, associated with the shared resource, from the priority determining unit, wherein the recording register includes N(N-1)/2 flip-flops adapted to indicate a relative shared-resource using order among N request devices, said N being a natural number no less than 2, the recording register storing the resource using order based on the grant signal and outputting the stored resource to the priority determining unit; and a status machine for receiving the arbitration-done signal from the priority determining unit along with the request signals from the request devices and other control signals, thereby outputting a status information and control signal to the priority determining unit and a recording register control signal to the recording register.

2. The arbitration apparatus using a least recently used algorithm in accordance with claim 1, wherein the priority determining unit receives a signal for designating a priority determining mode for the priority determining unit, thereby determining whether the priority is given in a fixed mode or a least recently used mode.

3. The arbitration apparatus using a least recently used algorithm in accordance with claim 1, wherein the status machine switches its status in such a manner that it is switched from a parking status, wherein any of the request devices does not request to use the shared resource, to an arbitration-go status, wherein an arbitration operation is carried out, upon receiving the request signals, that it is switched to an arbitration-done status, indicative of the fact that the request device assigned with the right to use the shared resource is using the shared resource, upon receiving the arbitration-done signal after the arbitration operation is completed, and that it is switched to the arbitration-go status upon receiving subsequent request signals or to the parking status upon receiving no subsequent request signal.

4. The arbitration apparatus using a least recently used algorithm in accordance with claim 1, wherein the recording register comprises:

a control part adapted to receive, as its input, the grant signal from the priority determining unit; and a register part adapted to store and output information about the shared-resource using order under a control of the control part.

5. The arbitration apparatus using a least recently used algorithm in accordance with claim 1, wherein the N(N-1)/2 flip-flops each allocate each bit of a bit string allocated to the recording register in such a manner that the first, N-1 bits, which extend from the least significant place of the bit string, each indicates a relative resource using order between the first one of the request devices and each of the remaining request devices, the next, N-2 bits each indicates a relative resource using order between the second one of the request devices and each of the remaining request devices except for the first request device, and the last, 1 bit, which is arranged at the most significant place of the bit string, indicates a relative resource using order between the "N-1"-th one of the request devices and "N"-th one of the request devices.

6. The arbitration apparatus using a least recently used algorithm in accordance with claim 5, wherein each bit of the bit string has a value of 0 if one of two request devices associated with the bit has not used the shared resource for a longer period than the other request device and has a value of 1 if not.

* * * * *

UNITED STATES PATENT AND TRADEMARK OFFICE
CERTIFICATE OF CORRECTION

PATENT NO. : 5,748,969
DATED : May 5, 1998
INVENTOR(S) : Lee et al.

It is certified that error appears in the above-identified patent and that said Letters Patent is hereby corrected as shown below:

In column 2, at lines 37, 39, and in column 6, at line 12, please delete "fixrot" and insert --fix_rot--.

In column 2, at line 61, and in column 3, at lines 2, and 21, please delete "ARBIGO" and insert --ARBI_GO--.

In column 2, at line 63, and in column 3, at lines 7, 9, 21, and 23, please delete "ARBIDONE" and insert --ARBI_DONE--.

Signed and Sealed this

Eighth Day of June, 1999

Q. TODD DICKINSON

*Attest:*

*Attesting Officer*       Acting Commissioner of Patents and Trademarks